United States Patent
Kesten et al.

(10) Patent No.: US 10,397,167 B2
(45) Date of Patent: Aug. 27, 2019

(54) LIVE SOCIAL MODULES ON ONLINE SOCIAL NETWORKS

(71) Applicant: Facebook, Inc., Menlo Park, CA (US)

(72) Inventors: Yuval Kesten, San Francisco, CA (US); Shie S. Erlich, Sammamish, WA (US); Peter Wang Weng, Bellevue, WA (US); Markus Christian Messner Chaney, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 314 days.

(21) Appl. No.: 14/745,001

(22) Filed: Jun. 19, 2015

(65) Prior Publication Data

US 2016/0373397 A1    Dec. 22, 2016

(51) Int. Cl.
| | |
|---|---|
| *G06F 15/16* | (2006.01) |
| *H04L 12/58* | (2006.01) |
| *H04L 29/08* | (2006.01) |
| *H04L 29/06* | (2006.01) |

(52) U.S. Cl.
CPC .............. *H04L 51/32* (2013.01); *H04L 51/16* (2013.01); *H04L 67/02* (2013.01); *H04L 67/1034* (2013.01); *H04L 67/125* (2013.01); *H04L 67/20* (2013.01); *H04L 67/2842* (2013.01); *H04L 67/306* (2013.01); *H04L 67/42* (2013.01); *H04L 67/22* (2013.01)

(58) Field of Classification Search
CPC ..... H04L 51/32; H04L 67/2842; H04L 67/02; H04L 67/1034; H04L 67/125; H04L 67/20; H04L 67/42; H04L 67/306; H04L 51/16; H04L 67/22
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |

(Continued)

OTHER PUBLICATIONS

NPL: "Content based, Collaborative Recommendation", Balabanovic et al, CACM, Mar. 1997 (Year: 1997).*

*Primary Examiner* — Padma Mundur
(74) *Attorney, Agent, or Firm* — Baker Botts L.L.P.

(57) ABSTRACT

In one embodiment, a method includes accessing a post associated with a first user of an online social network; extracting n-grams from the post; determining whether the post is associated with a trending topic based on whether one or more of the extracted n-grams are associated with the trending topic; identifying one or more second users, wherein each second user is a first-degree connection of the first user within the online social network and wherein each second user is a subscribing user; generating, for each second user, a live social module comprising the post; and sending, to a system of each second user, the live social module.

37 Claims, 6 Drawing Sheets

(56) References Cited

U.S. PATENT DOCUMENTS

| | | |
|---|---|---|
| 8,112,529 B2 | 2/2012 | Van Den Oord |
| 8,135,721 B2 | 3/2012 | Joshi |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0136419 A1 | 6/2006 | Brydon |
| 2006/0190436 A1 | 8/2006 | Richardson |
| 2007/0277100 A1 | 11/2007 | Sheha |
| 2008/0033926 A1 | 2/2008 | Matthews |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0094200 A1 | 4/2009 | Baeza-Yates |
| 2009/0164408 A1 | 6/2009 | Grigorik |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0191371 A1 | 8/2011 | Elliott |
| 2011/0196855 A1 | 8/2011 | Wable |
| 2011/0231291 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0047147 A1 | 2/2012 | Redstone |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185486 A1 | 7/2012 | Voigt |
| 2012/0209832 A1 | 8/2012 | Neystadt |
| 2012/0209907 A1* | 8/2012 | Andrews ............ G06F 17/30867 709/204 |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0179504 A1* | 7/2013 | Adams ................ G06Q 30/02 709/204 |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0246404 A1 | 9/2013 | Annau |
| 2014/0006416 A1 | 1/2014 | Leslie |
| 2014/0067535 A1 | 3/2014 | Rezaei |
| 2014/0122465 A1 | 5/2014 | Bilinski |
| 2014/0164519 A1* | 6/2014 | Shah .................. H04L 67/306 709/204 |
| 2014/0280017 A1* | 9/2014 | Indarapu ........... G06F 17/30864 707/711 |
| 2015/0074131 A1* | 3/2015 | Fernandez ........ G06F 17/30029 707/758 |
| 2015/0356571 A1* | 12/2015 | Chang ................ G06Q 30/0201 705/7.29 |
| 2016/0140185 A1* | 5/2016 | Peterson ................ H04L 51/24 707/722 |
| 2016/0239581 A1* | 8/2016 | Jaidka ............... G06F 17/30719 |
| 2016/0292288 A1* | 10/2016 | Walton ............. G06F 17/30699 |

* cited by examiner

LIVE SOCIAL MODULES ON ONLINE SOCIAL NETWORKS

TECHNICAL FIELD

This disclosure generally relates to online social networks, and in particular generating a live social module on an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may generate a live social module that includes posts related to a particular topic (e.g., a trending topic) on an online social network. As an example and not by way of limitation, a live social module for a trending topic may be generated and sent to a user when the user has accessed a topic page (e.g., a trending-topics page), searched for a topic, or otherwise indicated interest in a topic. In generating the live social module, the social-networking system may access a post associated with a user of the online social network (e.g., a post authored by, liked by, reshared by, comments on by, or viewed by a user) and determine whether the post is related to the particular topic based on whether n-grams in the posts are associated with the particular topic. The social-networking system may identify one or more social connections of the user (e.g., friends or groups of the user) on the online social network. The social connections may be subscribing users to the particular topic. A user may be a subscribing user if, for example, the user has accessed a search-results page (e.g., a trending-topics page) related to the particular topic or in some other way has indicated interest in the particular topic. The user may remain a subscribing user until the user indicates a loss of interest in the particular topic (e.g., by closing or navigating away from the respective trending-topics page). If the social-networking system determines that the post is related to the particular topic, it may select that post for the live social module. The social-networking system may generate, for each subscribing user, a live social module that includes the post. The social-networking system may then send the generated live social module to each subscribing user. The live social module may then be updated continuously or semi-continuously to provide to the user ongoing personalized social commentary, e.g., by friends and groups of a subscribing user, regarding the particular topic. In particular embodiments, posts are pushed or broadcast to the user as they become associated with, e.g., friends or groups of the user. In particular embodiments, the social-networking system 160 may find related user posts by querying an index or a cache of posts. In particular embodiments, the social-networking system may use a scoring feature that selects for only posts that surpasses a threshold quality.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
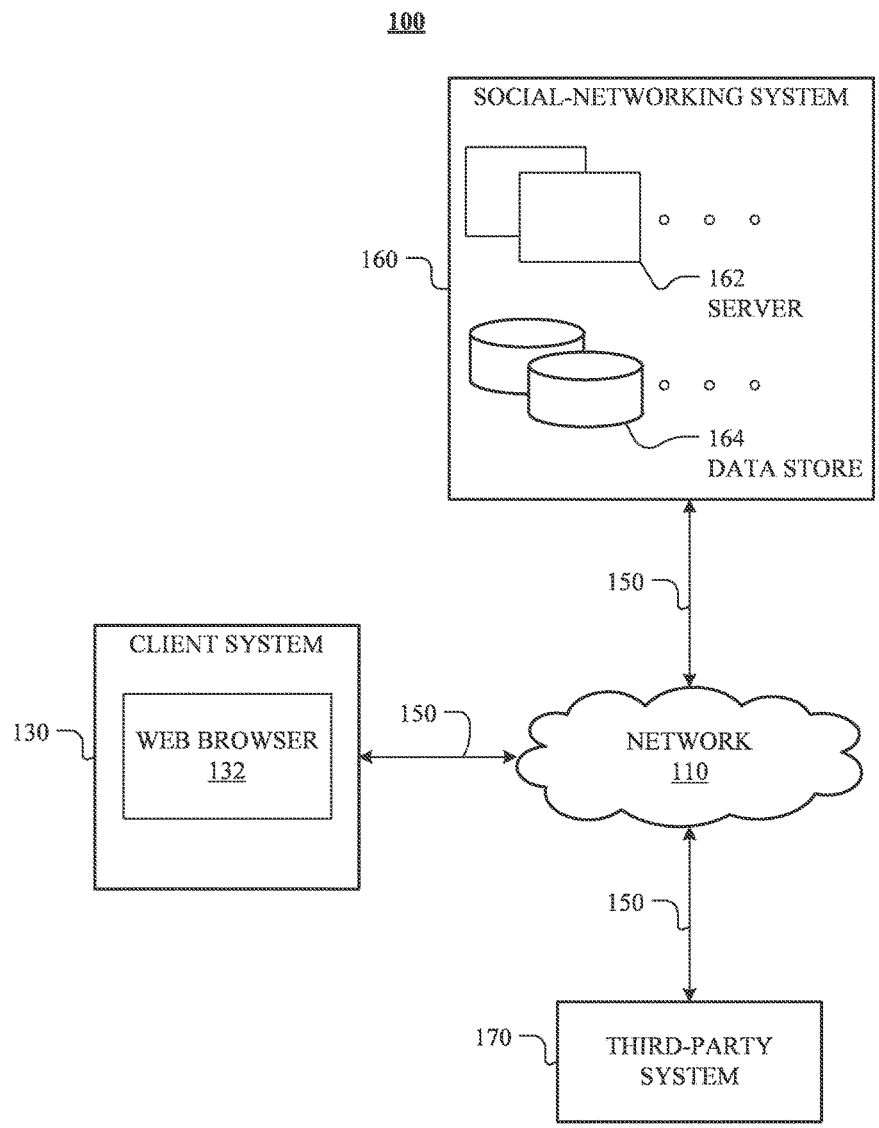
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-Active interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
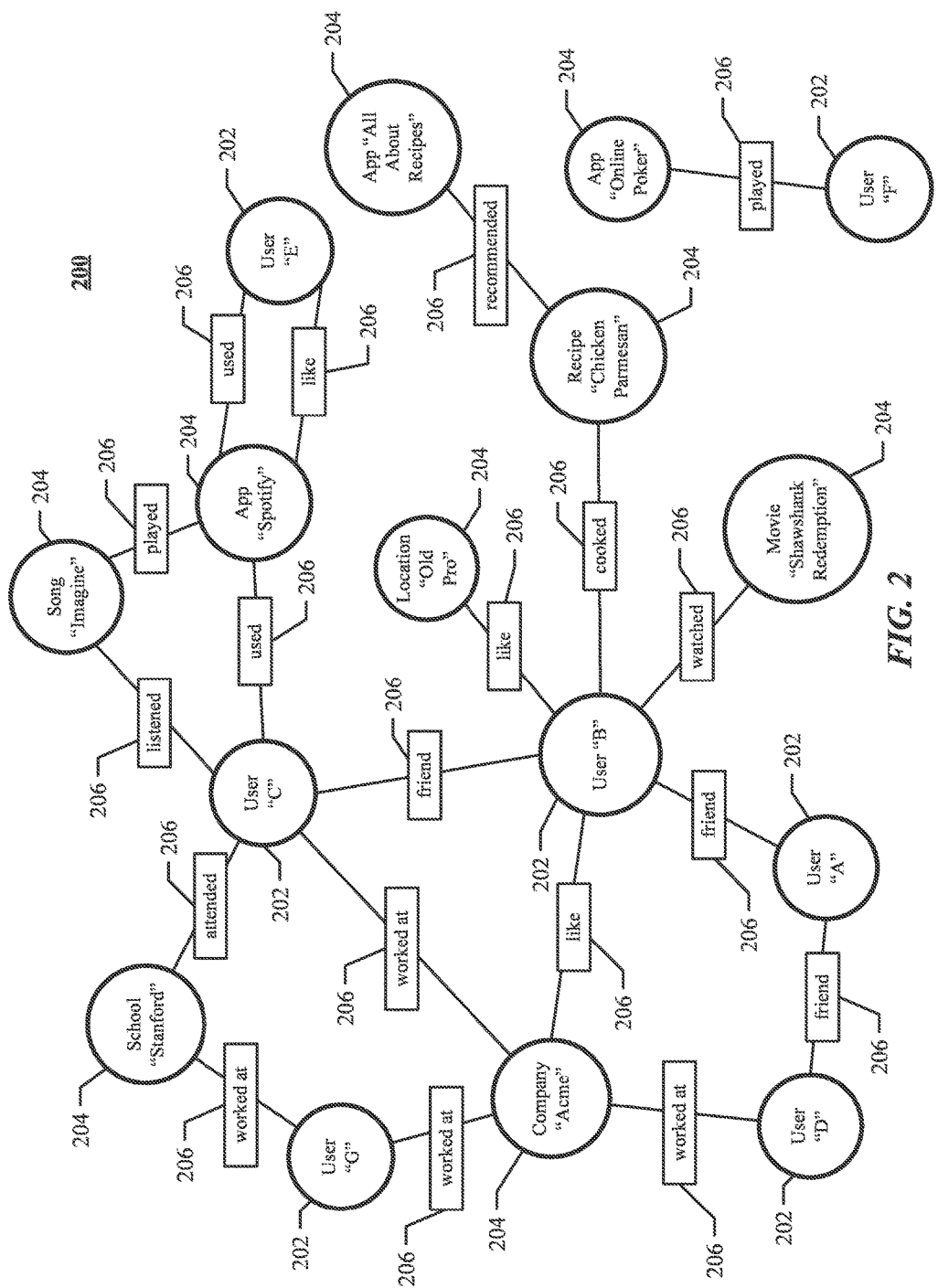
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface or view state of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a user (e.g., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree connections friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the querying user and displayed in a drop-down menu (via, for example, a client-side typeahead process), where the querying user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Live Social Modules

In particular embodiments, the social-networking system 160 may generate and send for display, to a client system 130 of a user, a live social module that includes user posts associated with (e.g., authored by, liked by, reshared by, commented on by, or viewed by) friends or groups of the user that are related to a particular topic (e.g., a trending topic) on an online social network. A live social module for a trending topic may be generated and sent to the user when the user has accessed a topic page (e.g., a trending-topics page), searched for a topic, or otherwise indicated interest in a topic. In particular embodiments, the social-networking system 160 may find related user posts associated with friends or groups of the user by querying an index or a cache of posts. The live social module may update continuously or semi-continuously to provide to the user ongoing personalized social commentary by friends or groups of the user regarding a topic. A user accessing a topic page (e.g., a trending-topics page), searching for a topic, or otherwise indicating interest in a topic may suggest that the user would find such social commentary relevant and interesting. Such a user may be treated as a "subscribing user" until the user indicates a loss of interest in the topic (e.g., by closing or navigating away from a respective trending-topics page). Related posts may be pushed or broadcast to the subscribing user as the related posts become associated with a friend or group of the subscribing user. Pushing the posts in this manner may avoid the need for the social-networking system 160 to cache significant numbers of posts (e.g., all posts by all friends and groups of every user), which may be storage-intensive. It also reduces the need to re-query post verticals or indexes of the social-networking system 160, which may be processor-intensive. In particular embodiments, the social-networking system 160 may use a scoring feature to select for and display only posts that surpass a threshold quality. The scoring feature may be beneficial because there may be many posts for a given topic at a time and only a limited number of posts may be usefully displayed to users on the online social network. The scoring feature may be used to select for the most relevant posts to display. The term "post" as used herein may include a publication created by a user on a newsfeed page or homepage of the online social network, on a user's own page of the online social network (e.g., the user's timeline or wall), on the page of the user's online-social-network connection (e.g., a timeline or wall of the user's first-degree connection or "friend"), on the page of a group on the online social network (e.g., a timeline or wall of a group related to a hobby), or on another suitable page of the online social network, where the publication does not reference another publication on the online social network. As used herein, the term "reshares" may include publications created by one or more users on the online social network, where the publications each reference another publication on the online social network (for example, the reshare may link to or embed a post). As described herein, a user may be "associated with" a post if the user authors, likes, reshares, comments on, or views a post on the online social network. The term "author user" as used herein is a type of user associated with a post, namely, by creating or "authoring" a post on the online social network. The term "topic page" as used herein describes a page of the online social network that includes posts and other content associated with a particular topic on the online social network (e.g., a trending-topics page may be a feed that includes posts and other content associated with a topic that is trending on the online social network). While this disclosure focuses on describing a live social module for posts in the trending-topics context, this disclosure contemplates using such modules in other search-related contexts (e.g., generating a live social module as part of a search-results page in response to any suitable search query, such as a structured query or a keyword query). Similarly, while this disclosure focuses on describing live social modules for trending topics, this disclosure contemplates live social modules for any suitable topic. Finally, although this disclosure focuses on a live social module that includes posts, this disclosure also contemplates such modules including reshares, comments, messages, objects (e.g., videos, photos, sound clips), or other suitable content associated with the online social network.

Figure 3:
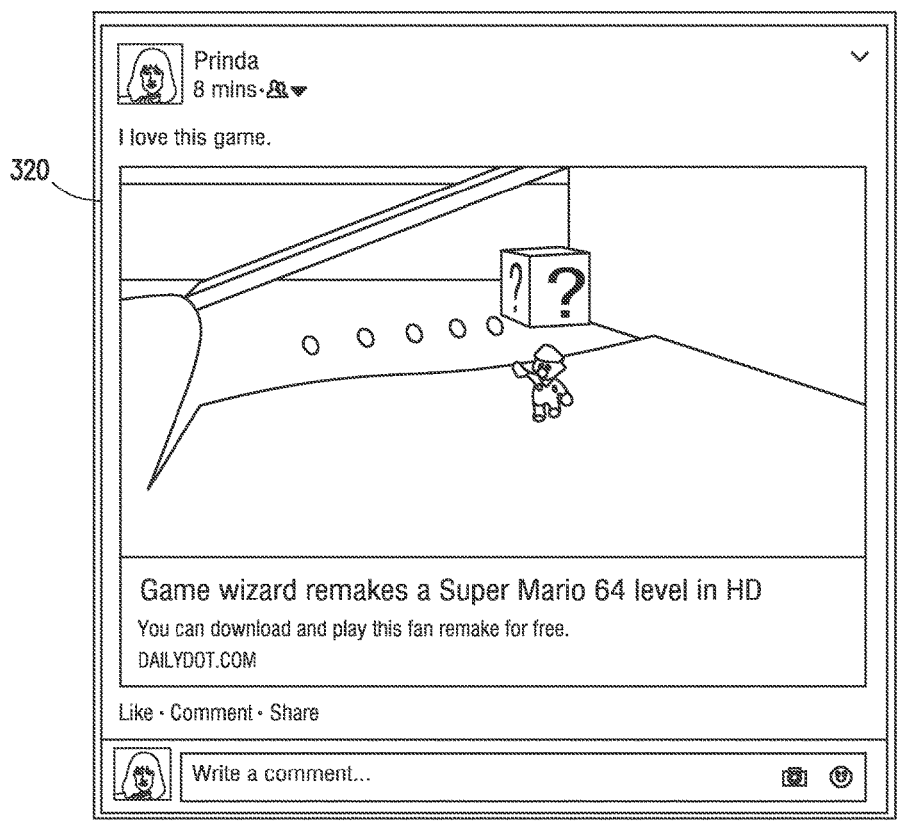
FIG. 3 illustrates an example of a post authored by a particular user of the online social network.

FIG. 3 illustrates an example of a post authored by a particular user of the online social network. In particular embodiments, the social-networking system 160 may access one or more posts of an online social network associated with a user. As an example and not by way of limitation, the social-networking system 160 may access a post by an author user when the author user authors a post. Each post may comprise content and metadata associated with the post. As an example and not by way of limitation, referencing FIG. 3, the social-networking system 160 may access the post 320. The content of the post 320 may include the text of the post 320 (e.g., "I love this game."). The metadata associated with a post may include the name of the post's respective author user (e.g., "Prinda"), the date and time associated with the post (e.g., eight minutes ago), a location associated with the post, the number of "likes" associated with the post, the number of shares associated with the post, the number of views associated with the post, other suitable data associated with the post, or any combination thereof. The metadata associated with the post may also include blurbs, titles, or URLs of any external webpage linked in the post (e.g., "Game wizard remakes a Super Mario 64 level in HD," "DAILYDOT.COM"), as well as information regarding the authors, topics, or sponsorship associated with the post and/or external content (which may either be retrieved from the external content or provided by the external-content provider as pre-tagged information associated with the post). In particular embodiments, social-networking system 160 may access the content and metadata of comments associated with a post. In particular embodiments, a post may also be accessed when it is reshared by another user. Although this disclosure focuses on accessing posts that are authored by author users, this disclosure also contemplates accessing posts that were liked by, reshared by, commented on by, or viewed by users. Furthermore, although this disclosure describes accessing particular posts in a particular manner, this disclosure contemplates accessing any suitable posts, reshares, or comments in any suitable manner.

In particular embodiments, the social-networking system 160 may extract, for each post, one or more n-grams from the content and metadata associated with the post. The extracting of n-grams may involve, for example, the social-networking system 160 parsing the content of the post and the metadata associated with the post to identify one or more n-grams. In general, an n-gram may be a contiguous sequence of n items from a given sequence of text. The items may be characters, phonemes, syllables, letters, words, base pairs, prefixes, or other identifiable items from the sequence of text or speech. The n-gram may include one or more characters of text (letters, numbers, punctuation, etc.) in the content of a post or the metadata associated with the post. In particular embodiments, each n-gram may include a character string (e.g., one or more characters of text). In particular embodiments, an n-gram may include more than one word. As an example and not by way of limitation, referencing FIG. 3, the social-networking system 160 may parse some or all of the text of the content or metadata of the post 320 (e.g., "Game wizard remakes a Super Mario 64 level in HD") to identify n-grams that may be extracted. The social-networking system 160 may identify, among others, the following n-grams: game; wizard; game wizard; remakes; remakes a; remakes a super; remakes a super mario; super; super mario; super mario 64; mario; 64; level; in; in hd; and hd. Some or all of the n-grams may be extracted. For example, the n-grams "super mario 64," "game," and "remakes" may be extracted. As another example and not by way of limitation, social-networking system 160 may parse some or all of the text from the name of the author user of the post 320 (e.g., "Prinda"), the content of the post (e.g., "I love this game"), other suitable content or metadata associated with the post (e.g., the location associated with the post 320; "DAILYDOT.COM," the source of the link in the post 320), or any combination thereof. In particular embodiments, content and metadata from a post's comments may also be extracted. In particular embodiments, the social-networking system 160 may extract n-grams from a post based on a term frequency-inverse document frequency (TF-IDF) analysis of the content of the post in relation to a set of posts. The TF-IDF is a statistical measure used to evaluate how important a word is to a document (e.g., a post) in a collection or corpus (e.g., a set of posts). The importance increases proportionally to the number of times a word appears in a particular document, but is offset by the frequency of the word in the corpus of documents. The importance of a word in a particular document is based in part on the term count in a document, which is simply the number of times a given term (e.g., a word) appears in the document. This count may be normalized to prevent a bias towards longer documents (which may have a higher term count regardless of the actual importance of that term in the document) and to give a measure of the importance of the term t within the particular document d. Thus we have the term frequency tf (t, d), defined in the simplest case as the occurrence count of a term in a document. The inverse-document frequency (idf) is a measure of the general importance of the term which is obtained by dividing the total number of documents by the number of documents containing the term, and then taking the logarithm of that quotient. A high weight in TF-IDF is reached by a high term frequency in the given document and a low document frequency of the term in the whole collection of documents; the weights hence tend to filter out common terms. As an example and not by way of limitation, referencing FIG. 3, a TF-IDF analysis of the text of the post 320 may determine that the n-grams "super" and "mario" should be extracted, where these n-grams have high importance within the post 320. Similarly, a TF-IDF analysis of the post 320 may determine that the n-grams "a" and "in" should not be extracted, where these n-grams have a low importance within the post 320 (because these are common terms in many posts). Although this disclosure describes extracting particular n-grams from particular content and metadata in a particular manner, this disclosure contemplates extracting any suitable n-grams from any suitable place in any suitable manner.

In particular embodiments, the social-networking system 160 may determine whether the post is associated with a particular topic such as a trending topic based on whether one or more of the extracted n-grams are associated with the topic. The social-networking system 160 may determine a topic associated with a post by first determining one or more topics associated with the n-grams of the post (e.g., from its content and metadata). The one or more topics may be selected from a subject dictionary of the social-networking system 160. The subject dictionary may be represented by a set of interconnected nodes, which represent topics, connected by edges representing relatedness between the nodes. The social-networking system 160 may create the subject dictionary once, updating the dictionary organically over time, or it may create a new dictionary from scratch periodically. In particular embodiments, the social-networking system 160 may create a subject dictionary based on a publicly available database, such as an online encyclopedia database. The social-networking system 160 may determine the one or more topics associated with each extracted keyword by matching each extracted keyword with one or more appropriate nodes in the subject dictionary. Topic association involves discriminating among various possible topics to determine the most appropriate topic for a keyword. This may be done by, for example, determining the context of the post by using a forward-backward algorithm to calculate a probability of the extracted keyword matching the topic based on adjacent n-grams that match the topic also being present. More information on topic association may be found in U.S. patent application Ser. No. 13/167,701, filed 23 Jun. 2011, and U.S. patent application Ser. No. 14/585, 782, filed 30 Dec. 2014, each of which is incorporated by reference. As an example and not by way of limitation, referencing FIG. 3, the n-gram "mario" in the post 320 may be associated with the topic "Super Mario 64: Video Game" and not the topic "Mario Winans: Singer." In particular embodiments, to determine whether the post is associated with a trending topic, the social-networking system 160 may first access a list of trending topics that are currently trending on the online social network. The social-networking system 160 may then match the one or more n-grams from the post with one or more n-grams associated with one or more trending topics on the list of trending topics. The list of trending topics may be populated by topics that have achieved a threshold popularity on the online social network. A topic may achieve a threshold popularity on the online social network if there exists a threshold number of posts, reshares, comments, or any combination thereof on the social-networking system associated with the topic (i.e., the topic has become a big enough source of discussion on the online social network). In particular embodiments, the popularity of a topic may be based on its popularity outside the online social network, which may be determined by the social-networking system 160 by crawling an outside source (e.g., an online index, database, or news source). As an example and not by way of limitation, the social-networking system 160 may determine that a topic related to a news item is popular if it is featured prominently on a website of a particular news source. Although this disclosure describes determining whether posts are associated with a particular topic in a particular manner, this disclosure contemplates determining whether posts are associated with any suitable topic in any suitable manner.

In particular embodiments, the social-networking system 160 may, for a post determined to be associated with a particular topic (e.g., a trending topic), cache the post in a topic cache associated with the particular topic. The posts may be cached on one or more data stores 164 of the social-networking system 160. As an example and not by way of limitation, a topic cache associated with a trending topic may be cached entirely on a single data store 164. Alternatively, a topic cache may be partitioned across multiple data stores 164 (e.g., based on a geographic location associated with the post). Furthermore, the posts may be indexed in any suitable manner. As an example and not by way of limitation, posts in a topic cache may be indexed chronologically (e.g., from newest post to oldest post). Although this disclosure describes caching posts associated with particular topics in a particular manner, this disclosure contemplates caching posts associated with any suitable topic in any suitable manner.

In particular embodiments, the social-networking system 160 may identify one or more social connections of the author user based on their relation within the social graph 200 to the author user associated with a post. Each identified social connection may be within a threshold degree-of-separation from the author user (for example, each identified social connection may be a first-degree connection of the author user within the online social network). As an example and not by way of limitation, an identified social connection may be a first-degree connection of the author user that is connected by a friend-type edge 206 on the social graph 200 (e.g., a friend or family member of the user). As another example and not by way of limitation, an identified social connection may be a first-degree connection of the author user that is connected to the author user by a like-type edge 206 (e.g., the author user may be a group/business/other entity liked by the identified social connection) or an attended-type edge 206 (e.g., the author user may be a university the identified social connection attended). In particular embodiments, the identified social connections may include one or more second- or third-degree connections of the author user, having two or three degrees of separation, respectively, between the author user and the identified social connection. In particular embodiments, the social-networking system 160 may only identify a user as a social connection if the post is "visible" to that user as determined by privacy settings specified by the author user. As an example and not by way of limitation, if an author user specifies that a post is to be visible only to family members, the social-networking system 160 may only identify as social connections those first-degree connections who are also family members (and not, for example, first-degree connections who are merely friends). In particular embodiments, each identified social connection may be a subscribing user. A subscribing user for a particular topic may be an identified social connection who has indicated an interest in the particular topic. As an example and not by way of limitation, a social connection may have affirmatively indicated an interest in the particular topic (e.g., by clicking on a "subscribe" button), thereby becoming a subscribing user. As another example and not by way of limitation, the identified social connection may have implicitly indicated an interest in the particular topic by, for example, accessing a topic page such as a trending-topics page associated with the particular topic. As another example and not by way of limitation, an identified social connection may have implicitly indicated an interest in a particular topic by submitting a search query for the particular topic. In particular embodiments, the identified social connection may cease to be a subscribing user for a particular topic when the identified social connection has indicated a loss of interest in the particular topic. As an example and not by way of limitation, the identified social connection may remain a subscribing user until the identified social connection affirmatively indicates a loss of interest (e.g., by clicking on an "unsubscribe" button). As another example and not by way of limitation, the identified social connection may remain a subscribing user until the identified social connection implicitly indicates a loss of interest (e.g., by closing or navigating away from the respective topic page or other search-results page). Although this disclosure describes identifying particular users in a particular manner, this disclosure contemplates identifying any suitable users in any suitable manner.

Figure 4:
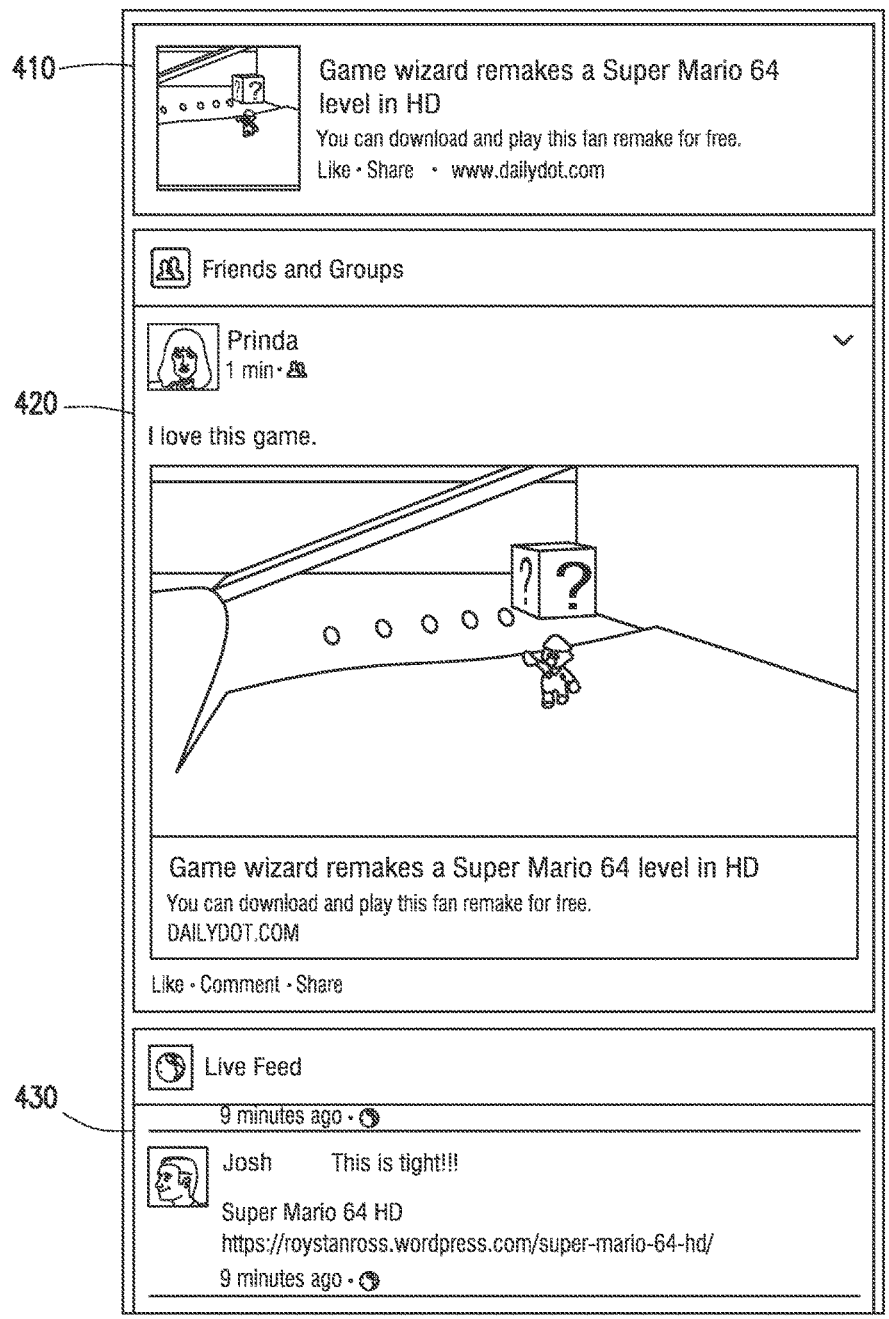
FIG. 4 illustrates an example portion of a search-results page that includes a live social module.

FIG. 4 illustrates an example portion of a search-results page that includes a live social module. In particular embodiments, the social-networking system 160 may calculate a quality-score for the post. In particular embodiments, the quality-score of the post may be based on the number of n-grams in the post that are related to the particular topic (e.g., a trending topic). The social-networking system may determine that an n-gram is related to the particular topic if the n-gram matches one or more n-grams associated with the particular topic. In particular embodiments, the quality-score of a post may be based on the quality of the match between the n-grams of the post and n-grams associated with the trending topic. The quality of the match may be based on a relationship between the topics associated with the n-grams of the post and the particular topic. As an example and not by way of limitation, referencing FIG. 4, the n-gram "play" in a post may be a medium quality match for the trending topic "Game Wizard Remakes a Super Mario 64 Level in HD" (as determined by the social-networking system 160 in describing the topic referenced by the link 410), because "play" may be only weakly associated with that topic. As another example and not by way of limitation, referencing FIG. 4, the n-gram "mario" may be a high-quality match for being strongly associated with the topic. The quality of the match may be based on a ratio or number of characters that match each substantially matching n-gram associated with the trending topic. As an example and not by way of limitation, referencing FIG. 4, the social-networking system 160 may determine a high-quality match between the n-gram "n64" (which refers to a video game system) that was extracted from the content of a post and the n-gram "64" associated with the trending topic. In particular embodiments, the social-networking system 160 may determine the quality of the match based on the edit distance between an n-gram of a post and an n-gram associated with a trending topic. Edit distance is a way of quantifying how dissimilar two strings (e.g., words) are to one another by counting the minimum number of operations required to transform one string into the other (e.g., the number of characters that need to be changed and the relative position of the characters). As an example and not by way of limitation, the n-gram "john wanye" may be a high-quality match for the topic "John Wayne" because only a single operation is required to transform "wanye" into "wayne" (a switch of the characters "n" and "y" in "wanye"), and by contrast, may be a low-quality match for the topic "Lil Wayne" because five operations are required to transform "john wanye" into "lil wayne". In particular embodiments, the quality-score of a post may be based on the presence of undesirable content in posts. As an example and not by way of limitation, posts with expletives or offensive terms may receive a low quality-score. An another example and not by way of limitation, posts with a relatively large number of capitalized letters (e.g., posts in all-caps or posts with a high ratio of capitalized letters to non-capitalized letters) or nonconventional capitalizations (e.g., posts in alternating caps ("aLtErNaTiNg CaPs")) may receive a reduced score. In particular embodiments, the quality-score of a post may be based on the social signals (e.g., the number of likes, comments, reshares) associated with the post. As an example and not by way of limitation, a post with a relatively high number of likes may receive a higher quality-score than a post with fewer likes. In particular embodiments, the quality-score of a post may be based on a sentiment of the post. As an example and not by way of limitation, a post that is associated with positive emotions may receive a higher quality-score than a post associated with negative emotions. As another example and not by way of limitation, a post that may amount to negative social interactions like "cyber-bullying" may receive a lower quality-score. In particular embodiments, the quality-score of a post may be based on a likelihood that a post is associated with spam. More information on calculating a quality-score for a post based on the likelihood that it is associated with spam may be found in U.S. patent application Ser. No. 14/695,540, filed 24 Apr. 2015, which is incorporated by reference. Although this disclosure describes calculating a quality-score for posts in a particular manner, this disclosure contemplates scoring posts in any suitable manner.

In particular embodiments, the quality-score of a post may be based on information associated with the author user. The information associated with the author user may include, for example, demographic information, geographical information, a history of the author user's past activity, a history of social signals the author user has received from other users, the type of user the author user is, other suitable information associated with the author user, or any combination thereof. In particular embodiments, the quality-score of a post may be based on demographic information associated with the author user. As an example and not by way of limitation, with respect to a topic affecting people in California, a post by an author user whose hometown is in California may receive a higher quality-score than a post about the topic by an author user whose hometown is in Texas. In particular embodiments, the quality-score of a post may be based on geographical information associated with the post itself. As an example and not by way of limitation, a post by an author who is currently located in Paris, France related to a breaking-news event in Paris, France may receive a relatively high quality-score as compared with a similar post by an author who is located in Frankfurt, Germany. In particular embodiments, the information associated with the author user may include a history of the author user's past activity on the online social network. As an example and not by way of limitation, a post by an author user who is active on the online social network (e.g., a user who frequently authors posts, likes/shares/comments on posts or pages) may receive a relatively high quality-score in particular embodiments. As another example and not by way of limitation, a post by a user who is not active on the online social network may receive a relatively high quality-score. In particular embodiments, the information associated with the author user may include a history of social signals received from other users of the online social network. This may be an indication of the author user's general influence over users of the online social network and may therefore indicate that subscribing users might be interested in the author user's posts. As an example and not by way of limitation, a post by an author user who has a history of receiving "likes," comments, or reshares for posts in the past may receive a relatively high quality-score. In particular embodiments, the quality-score may be based on the type of user that the author user is. As an example and not by way of limitation, a post by an author user who is a person may receive a higher quality score than a post by an author user that is a group or entity.

In particular embodiments, the quality-score of a post may be based on whether the author user that authored the post is identified as a key-author with respect to a particular topic (e.g., a trending topic) associated with the post. A key-author for a certain topic may refer to an author user that is relevant to, associated with, or knowledgeable about that topic. As an example and not by way of limitation, the actor William Shatner (who acted in the Star Trek television shows and movies) may be a key-author associated with the topic "Star Trek." As another example and not by way of limitation, an author user who is determined to be a biomedical engineer (such determination being made based on, for example, a listed occupation in the person's user profile) may be a key-author associated with the topic "Genome Sequencing." In particular embodiments, a key-author for a certain topic may refer to an author user that often authors posts relating to the topic. As an example and not by way of limitation, an author user that often posts about movies may be a key-author associated with the topic "The Oscars." In particular embodiments, a topic may have multiple key-authors associated with it. As an example and not by way of limitation, each of the members of a rock band may be key-authors associated with the band (e.g., John Lennon, Paul McCartney, George Harrison, and Ringo Starr may each be key-authors associated with the topic "The Beatles"). In particular embodiments, a key-author may be associated with multiple topics. As an example and not by way of limitation, comedian and banjo-player Steve Martin may be a key-author associated with the topic "Comedy," and Steve Martin may also be a key-author associated with the topic "Banjo." In particular embodiments, a key-author associated with a certain topic may also be a topic. As an example and not by way of limitation, soccer player Lionel Messi may be a key-author associated with the topic "Futbol Club Barcelona," and Lionel Messi himself may also be associated with the topic "Lionel Messi". As another example and not by way of limitation, First Lady Michelle Obama may be a key-author associated with the topic "Barack Obama," and conversely, President Barack Obama may be a key-author associated with the topic "Michelle Obama." The key-authors may themselves may have an author-score which may be used to determine the effect they have on the quality-score. As an example and not by way of limitation, a post made by a key-author (e.g., a post about a new song from the singer Shakira made by Shakira herself) may receive a higher quality-score than an identical post by another key-author (e.g., a post about the new song from Shakira made by a music critic). More information on identifying key-authors and determining author-scores may be found in U.S. patent application Ser. No. 14/554,190, filed 26 Nov. 2014, which is incorporated by reference. In particular embodiments, the social-networking system 160 may base the quality-score of a post on the number of "likes," reshares, comments, or any combination thereof associated with the post, such that a post with a high number of "likes," reshares, or comments may receive a correspondingly high quality-score.

In particular embodiments, the quality-score of a post may be based on information associated with the individual subscribing user for whom the live social module is generated. A quality-score may be calculated for each of the subscribing users. In particular embodiments, the quality-score may be based on information associated with the user. The information associated with the user, in particular embodiments, may include demographic information associated with the user or with the author user. As an example and not by way of limitation, a post may receive a higher quality-score if the author user and the subscribing user are in the same age group. The information associated with the subscribing user, in particular embodiments, may include information in the subscribing user's settings or user profile. As an example and not by way of limitation, if the subscribing user's language settings are set to French, the quality-score of an author user's post that is in French may be higher than a similar post in Italian. As another example and not by way of limitation, if the subscribing user's profile indicates that the user can speak Spanish, a post in Spanish may receive a higher score. The information associated with the user, in particular embodiments, may include a relationship between the subscribing user and the author user. As an example and not by way of limitation, a post may receive a higher score if the subscribing user is a family member of the author user (e.g., if the subscribing user is a first-degree connection that is connected by a brother-type edge). The social-networking system 160 may determine these connections by, for example, querying the social-graph 200 to determine the edge type connecting the author user to the subscribing user. In particular embodiments, the quality-score of the post may be based on a social-graph affinity the subscribing user has for the author user, and posts by author users for whom the subscribing user has a high affinity may receive a higher quality-score. As an example and not by way of limitation, a subscribing user may have a high affinity for an author user with whom the subscribing user often interacts with on the online social network. In determining the frequency of the interaction between a subscribing user and the author user, the social-networking system 160 may consider, for example, a history of the subscribing user's activities with respect to the author user's posts, including liking, commenting on, or viewing the author user's previous posts. The social-networking system 160 may consider a history of other interactions between the subscribing user and the author user such as messages and posts made on each other's timelines or walls. The social-networking system 160 may consider how often the subscribing user views a page associated with the author user (e.g., the author user's profile page). In particular embodiments, the quality-score may be based on a history of activity by the subscribing user on the online social network. As an example and not by way of limitation, if the subscribing user has a history of awarding positive social signals to (e.g., "liking," commenting on) content posted by the author user, a post by the author user may receive a higher quality-score. For example, referencing FIG. 4, if the user has a history of liking posts by the author user "Prinda" in the live social module 420, posts by the author user "Prinda" may receive a higher quality-score. As another example and not by way of limitation, if the subscribing user has a relatively high number of social signals (e.g., "liking," commenting/posting on) associated with content having particular sentiments (e.g., posts that are determined to be favorable to a particular celebrity), a post with a similar sentiment (e.g., a post that states a positive quality of the particular celebrity) may receive a higher quality-score. As another example and not by way of limitation, if the subscribing user has a relatively high number of social signals (e.g., "liking," commenting on, or authoring posts about) associated with content related to an ancillary topic (e.g., another topic associated with a post that is not the trending topic), a post associated with that ancillary topic may receive a higher quality-score. For example, in a live social module related to the trending topic "The Oscars," a post about the winner of the category "Actress in a Leading Role" may receive a higher quality-score if the subscribing user has commented on that category before or has otherwise shown an interest in movie actresses within the online social network.

In particular embodiments, the social-networking system 160 may generate, for each subscribing user, a live social module for a particular topic (e.g., a trending topic) that includes the post authored by the author user. In particular embodiments, the post authored by the author user is included only if it has a quality-score greater than a threshold quality-score. In particular embodiments, more than one post related to the particular topic may be aggregated for a live social module. Posts related to the particular topic and authored by one or more author users may be located by querying an associated topic cache or a post-index of the online social network. The query may only return a post if it is "visible" to the subscribing user, as determined by privacy settings specified by the author user. Quality-scores for these posts may be calculated, if quality-scores for them have not already been calculated. These posts may be aggregated and included within the live social module if they have a quality-score higher than a threshold quality-score. In particular embodiments, the live social module may only be rendered if there are sufficient posts related to the particular topic within a predetermined time period (e.g., if there have been at least three related posts within the past twelve hours). As an example and not by way of limitation, referencing FIG. 4, the social-networking system 160 may generate the live social module 420 for a particular topic (e.g., the trending topic "Game Wizard Remakes a Super Mario 64 Level in HD"), where the live social module includes at least one post associated with the particular topic that was authored by an author user within the past twelve hours (e.g., the post authored by the user "Prinda"). In particular embodiments, the quality-score and the threshold quality-score may correspond to a quality-rank and a threshold quality-rank, respectively. As an example and not by way of limitation, if the threshold quality-rank is set to three, only posts ranked first, second, or third may be included in the live social module at a given time. In particular embodiments, there may be a pre-determined maximum number of posts that may be included in the live social module. As an example and not by way of limitation, if the predetermined maximum number of posts is set to three, only three posts may be included in the live social module at a given time, and these posts may be selected based on their respective scores or ranks. In particular embodiments, the live social module associated with a particular topic is generated for a subscribing user in response to the subscribing user having subscribed to the particular topic (e.g., by accessing a trending-topics page, by submitting a search query determined to be related to a topic). As an example and not by way of limitation, the user may have entered a search query for "mario" in a search field on a page of the online social network. In response, referencing FIG. 4, the social-networking system 160 may generate the live social module

420. Although this disclosure describes generating a live social module in a particular manner, this disclosure contemplates generating any suitable module in any suitable manner.

In particular embodiments, the social-networking system 160 may send the generated live social module to a client system 130 of a subscribing user of the online social network. As an example and not by way of limitation, the social-networking system 160 may send a live social module associated with a particular topic to the client system 130 of a subscribing user who has searched for the particular topic. As another example and not by way of limitation, referencing FIG. 4, the live social module 420 may be sent to the subscribing user in response to the subscribing user accessing a respective trending-topics page. The live social module 420 may be sent as one of several modules associated with the trending topic, with the module 430 being, for example, another one. As another example and not by way of limitation, the live social module may be sent to the subscribing user in response to an input from the subscribing user indicating interest in an associated topic (e.g., the clicking of a button on the trending-topics page, a button associated with a post on the online social network). In particular embodiments, the social-networking system 160 may send the live social module to the user as part of a search-results page in response to receiving a search query from a client system 130 of the subscribing user. The social-networking system 160 may also send other responsive items. As an example and not by way of limitation, in response to a search for "mario," the social-networking system 160 may send a live social module relating to the topic, other modules related to the topic, users named "Mario," videos associated with the topic "Mario," and links to pages titled "Mario."

In particular embodiments, the social-networking system 160 may have a de-duplication feature, such that duplicative posts are not displayed in the live social module. A post may be determined to be duplicative if it has already been displayed or is being displayed in another module on the same page. In particular embodiments, the de-duplication feature may determine that a post is duplicative of another post if the two posts are determined to be sufficiently similar. As an example and not by way of limitation, the two posts may be determined to be sufficiently similar if they have a high ratio of n-grams in common. This may occur in an instance where an author user consecutively makes the same post twice by mistake. In particular embodiments, the social-networking system 160 may consider the order of the n-grams in the two posts to determine if they are sufficiently similar (e.g., "people love mario" may be similar to "peeps love mario" but not "mario loves people"). In particular embodiments, the social-networking system 160 may consider the identity of the user who authored the two posts in determining whether they are sufficiently similar. As an example and not by way of limitation, the social-networking system 160 may determine that two posts that have identical content but are authored by two different users are not sufficiently similar. In particular embodiments, the de-duplication may involve reducing the quality-score of a duplicative post. In particular embodiments, a de-duplication may involve simply removing a post determined to be duplicative from a live social module. In particular embodiments, a de-duplication may involve removing a post determined to be duplicative from a topic cache.

In particular embodiments, the social-networking system 160 may update the live social module displayed to a subscribing user in response to the subscribing user having clicked a button indicating an interest in seeing other related posts. As an example and not by way of limitation, the live social module for a particular topic may be updated in response to the subscribing user having clicked on a button with a jewel notification displaying the number of other posts related to the particular topic. In particular embodiments, the social-networking system 160 may update the live social module periodically. It may do so by replacing one or more of the posts displayed in the live social module with one or more other posts. As an example and not by way of limitation, the social-networking system 160 may replace one out of three displayed posts. As another example and not by way of limitation, it may replace all three of the three displayed posts. In particular embodiments, one or more displayed posts may be replaced by other posts as they are first accessed by the social-networking system 160. As an example and not by way of limitation, immediately or soon after another post related to a particular topic is authored by an author user, the post may be pushed or broadcast to the live social module for a subscribing user who is subscribing to the particular topic. In particular embodiments, the social-networking system 160 may replace a displayed post with the other post. For example, referencing FIG. 4, the social-networking system 160 may immediately replace a displayed post (e.g., the post by the author "Prinda") with another post having to do with the same trending topic as soon as the other post is made. As examples and not by way of limitation, the replaced post may be the oldest post (e.g., a post with a timestamp older than the other displayed posts) or the post with the lowest-quality score. In particular embodiments, the update may be scheduled to occur at a static, pre-determined time interval (e.g., every five minutes). In particular embodiments, the update may occur at dynamic intervals determined by the number of new posts associated with the respective trending topic. As an example and not by way of limitation, if there are many new posts being authored about a particular trending topic, the social-networking system 160 may, as an example and not by way of limitation, replace posts at relatively short time intervals (e.g., every six seconds). By contrast, if there are very few posts being made about the topic, the social-networking system 160 may, as an example and not by way of limitation, replace posts at relatively long time intervals (e.g., every minute). In particular embodiments, the update may occur solely based on the number of posts without any separate time element. As an example and not by way of limitation, the social-networking system 160 may replace posts every time a threshold number of new posts (e.g., five posts) about a topic is made. In particular embodiments, the other posts that replace one or more of the displayed posts during an update may be posts that were created on the online social network at a later time than the replaced posts (i.e., newer posts may replace older posts). In particular embodiments, newer posts for the module may be found by the social-networking system 160 submitting a query for posts above a threshold quality-score/rank within a subset of posts that have time-stamps later than the oldest of the currently displayed posts. In particular embodiments, the other posts that replace one or more of the displayed may be selected based on their respective quality-scores. As an example and not by way of limitation, in a live social module with four displayed posts, an update may replace one of the four displayed posts with another post that has the next-highest quality-score. In particular embodiments, the posts that replace the existing posts are not posts that were created at a later time than the replaced one or more posts. As an example and not by way of limitation, if there exists a certain number of posts related to a particular topic and the newest posts have already been displayed, the social-networking system 160 may replace the displayed posts with older posts (e.g., when an update is scheduled to occur). The older posts replacing the displayed posts may be posts with the next-highest quality-scores, as described above. In particular embodiments, the updating of posts may occur indefinitely until the social-networking system 160 runs out of posts. In particular embodiments, the updating may continue even after the social-networking system 160 runs out of posts, cycling through posts that have already been displayed. In particular embodiments, the live social module may be updated by generating and sending a replacement live social module containing one or more other posts. As an example and not by way of limitation, a replacement live social module may be sent every five minutes with one or more other posts replacing one or more of the displayed posts. Although this disclosure describes updating the live social module in a particular manner, this disclosure contemplates updating any suitable module in any suitable manner.

Figure 5:
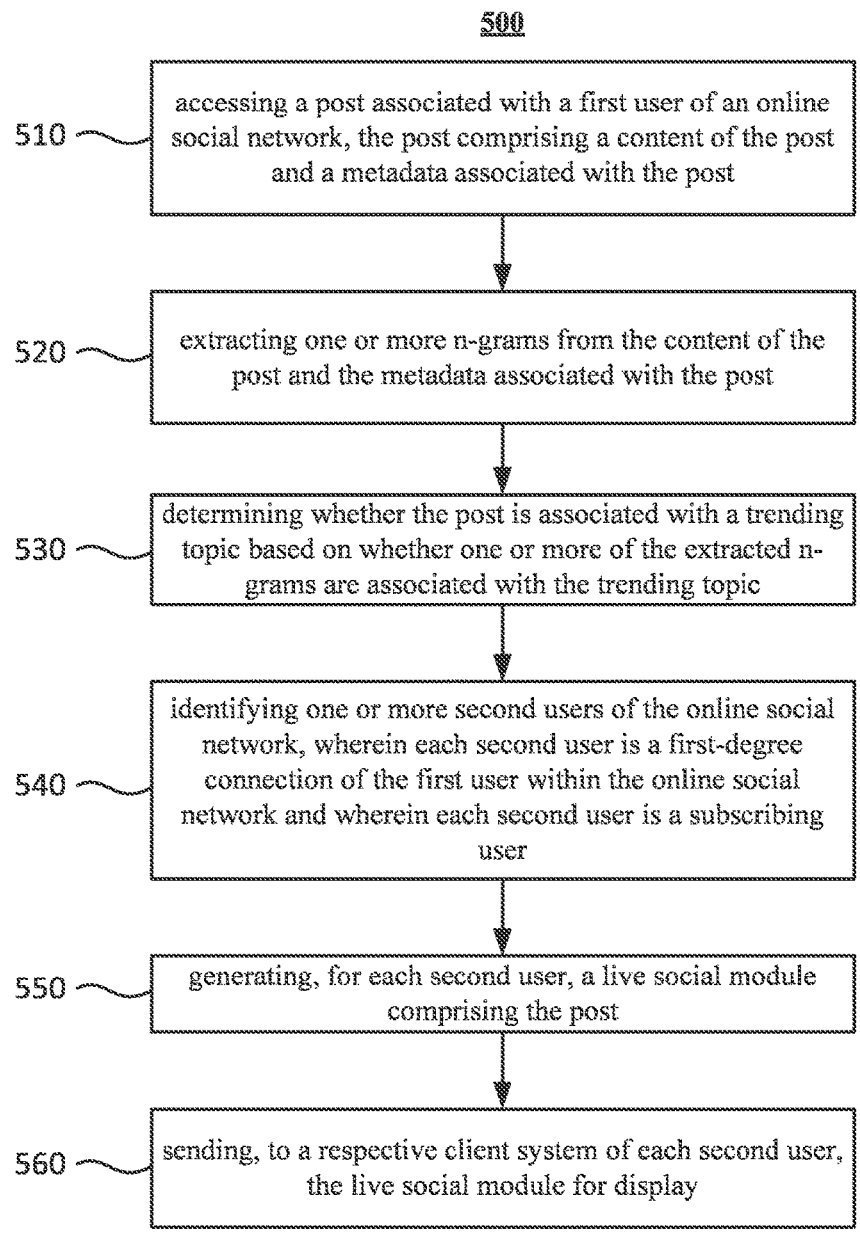
FIG. 5 illustrates an example method for generating a live social module.

FIG. 5 illustrates an example method 500 for generating a live social module. The method may begin at step 510, where the social-networking system 160 may access a post associated with a first user of an online social network, the post comprising a content of the post and a metadata associated with the post. At step 520, the social-networking system 160 may extract one or more n-grams from the content of the post and the metadata associated with the post. At step 530, the social-networking system 160 may determine whether the post is associated with a trending topic based on whether one or more of the extracted n-grams are associated with the trending topic. At step 540, the social-networking system 160 may identify one or more second users of the online social network, wherein each second user is a first-degree connection of the first user within the online social network and wherein each second user is a subscribing user. At step 550, the social-networking system 160 may generate, for each second user, a live social module comprising the post. At step 560, the social-networking system 160 may send, to a respective client system of each second user, the live social module for display. The live social module may be sent, for example, in response to the first user accessing a search-results page of the online social network associated with the trending topic. Particular embodiments may repeat one or more steps of the method of FIG. 5, where appropriate. Although FIG. 5 and the related description above describe a live social module for a trending topic, they may be equally applicable to describe a live social module for any suitable topic. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating a live social module including the particular steps of the method of FIG. 5, this disclosure contemplates any suitable method for generating a live social module including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part by a history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user may make frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 6:
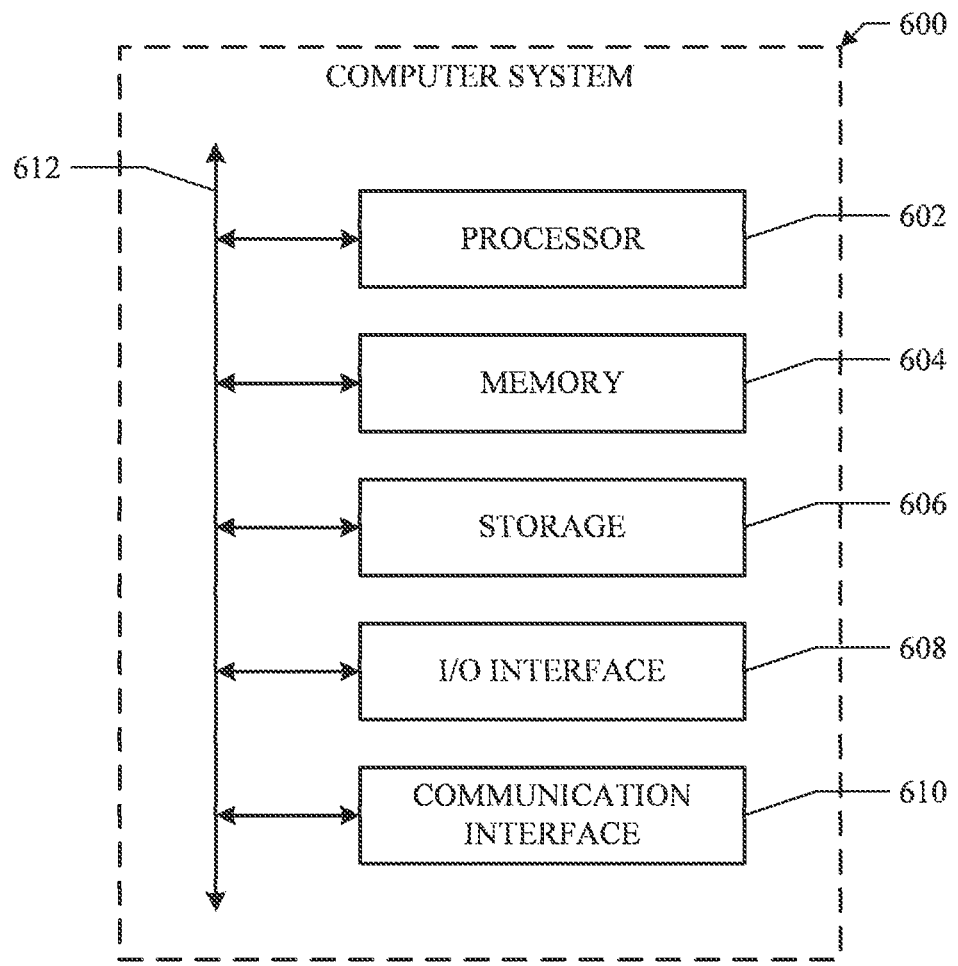
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:

receiving, at the one or more computing devices from a client system associated with an author-user of an online social network, instructions for publishing a first post composed by the author-user, the first post comprising a content of the first post and a metadata associated with the first post;

extracting, by the one or more computing devices, one or more n-grams from the content of the first post and the metadata associated with the first post;

determining, by the one or more computing devices, whether the first post is associated with a topic based on whether one or more of the extracted n-grams are associated with the topic;

identifying, by the one or more computing devices, a plurality of second users of the online social network, wherein each second user is a first-degree connection of the author-user within the online social network;

identifying, by the one or more computing devices, one or more of the second users as a subscribing user to the topic based on a determination that the second user is accessing a page associated with the topic;

generating, by the one or more computing devices, for each identified second user, a live social module associated with the topic for presenting, in real-time, posts shared on the online social network;

sending, by the one or more computing devices, to a respective client system of each identified second user, information configured to render a search-results page comprising the live social module, wherein the live social module is configured to be rendered in conjunction with a link associated with the topic, and wherein the live social module comprises an interface that displays, in real-time responsive to the receiving of the first post:

the content of the first post, and identifying information that is associated with the author-user;

receiving, by the one or more computing devices, a plurality of additional posts composed by users of the online social network, each additional post being associated with the topic;

pushing, in response to receiving the plurality of additional posts, at a first time interval, by the one or more computing devices to the respective client system of each second user, information configured to display content of one or more of the additional posts in the interface of the live social module; and sending, at each of a plurality of subsequent time intervals, by the one or more computing devices to the respective client system of each second user, information configured to refresh, in real-time responsive to the pushing of the one or more additional posts, the interface of the live social module with another post associated with the topic.

2. The method of claim 1, wherein identifying the one or more second users comprises:

accessing a social graph comprising a plurality of nodes and a plurality of edges connecting the nodes, each of the edges between two of the nodes representing a single degree of separation between them, the nodes comprising:

a first node corresponding to the author-user; and a plurality of other nodes that each correspond to concepts or users associated with the online social network; and identifying users corresponding to one or more user nodes that are each directly connected to the first node by an edge.

3. The method of claim 1, wherein generating a live social module comprises:

aggregating one or more posts associated with the topic by one or more author-users by querying a post-index of the online social network;

calculating, for each second user, a quality-score for each of the aggregated posts; and selecting, for each second user, one or more posts having a quality-score higher than a threshold quality-score.

4. The method of claim 3, wherein the quality-score of a post is based on a relationship on the social network between a respective author-user and the second user.

5. The method of claim 3, wherein the quality-score of a post is based on a social-graph affinity for the second user with respect to a respective author-user.

6. The method of claim 3, wherein the quality-score of a post is based on whether a respective author-user is identified as a key-author with respect to the topic.

7. The method of claim 3, wherein the quality-score of a post is based on a sentiment of the post.

8. The method of claim 3, wherein the quality-score of a post is based on information associated with the second user.

9. The method of claim 8, wherein the information associated with the second user comprises one or more of demographic information associated with the second user or a history of activity by the second user on the online social network.

10. The method of claim 1, further comprising updating the live social module with one or more third posts.

11. The method of claim 10, wherein the live social module is updated with one or more third posts by generating a replacement live social module to replace the live social module that was previously sent to the one or more second users.

12. The method of claim 10, wherein the live social module is updated with one or more third posts by replacing one or more of the first or additional posts in the live social module with one or more third posts.

13. The method of claim 10, wherein the one or more third posts were authored at a later time than the first or additional posts.

14. The method of claim 1 wherein a subscribing user is a user who has accessed a topic page associated with the topic.

15. The method of claim 1 wherein a subscribing user is a user who has submitted a search query associated with the topic.

16. The method of claim 1, wherein the live social module is sent to the second user in response to the second user accessing a topic page of the online social network associated with the topic.

17. The method of claim 1, further comprising:

receiving, from a client system of a second user, a search query associated with the topic; and sending, to the client system of the second user, the search-results page comprising the live social module and one or more other modules associated with the topic.

18. The method of claim 1, wherein determining whether the first post is associated with a topic further comprises:

accessing a list of topics that are currently trending on the online social network; and matching the one or more n-grams from the content of the first post and the metadata associated with the first post with one or more n-grams associated with one or more topics on the list of topics.

19. The method of claim 1, further comprising:
receiving, from one of the identified second users, an indication of a loss of interest in the topic, wherein the identified second user indicates the loss of interest by navigating away from the search-results page; and
unsubscribing the one of the identified second users from the topic.

20. The method of claim 1, further comprising:
for each identified second user, scoring each additional post, wherein a higher respective score is assigned to an additional post of the plurality of additional posts that is authored by a user having a first-degree connection in the online social network to the identified second user or having a common demographic characteristic with the identified second user; and
adding at least one of the additional posts having a respective score higher than a threshold score to the interface of the live social module.

21. The method of claim 1, wherein the subsequent time intervals are periodic time intervals having a predetermined length, and wherein the sending at each of the plurality of subsequent time intervals comprises:
sending, at each subsequent time interval, information configured to replace at least one post of the live social module with a new post.

22. The method of claim 1, wherein the subsequent time intervals are dynamic time intervals having a length determined by a number of new posts associated with the topic, and wherein the sending at each of the plurality of subsequent time intervals further comprises:
if the number of new posts is greater than or equal to a threshold, decreasing the length of the subsequent time intervals; and
if the number of new posts is less than the threshold, increasing the length of the subsequent time intervals.

23. The method of claim 1, wherein the subsequent time intervals are determined by a number of new posts associated with the topic, and wherein the sending at each of a plurality of the subsequent time intervals comprises:
sending information configured to replace at least one post of the live social module upon receiving a threshold number of the new posts.

24. The method of claim 1, wherein the sending at each of the plurality of subsequent time intervals comprises sending information configured to replace, at a subsequent time interval of the plurality of subsequent time intervals, at least one post of the live social module with an older post after a new post has been displayed in a previous time interval.

25. The method of claim 1, wherein the sending at each of the plurality of subsequent time intervals comprises sending information configured to cycle, at the interface of the live social module, through posts that have been displayed in previous time intervals if no new posts associated with the topic are received.

26. One or more computer-readable non-transitory storage media embodying software that is operable when executed to:
receive, at one or more computing devices from a client system associated with an author-user of an online social network, instructions for publishing a first post composed by the author-user, the first post comprising a content of the first post and a metadata associated with the first post;
extract, by the one or more computing devices, one or more n-grams from the content of the first post and the metadata associated with the first post;
determine, by the one or more computing devices, whether the first post is associated with a topic based on whether one or more of the extracted n-grams are associated with the topic;
identify, by the one or more computing devices, a plurality of second users, wherein each second user is a first-degree connection of the author-user within the online social network;
identify, by the one or more computing devices, one or more of the second users as a subscribing user to the topic based on a determination that the second user is accessing a page associated with the topic;
generate, by the one or more computing devices, for each identified second user, a live social module associated with the topic for presenting, in real time, posts shared on the online social network;
send, by the one or more computing devices, to a respective client system of each identified second user, information configured to render a search-results page comprising the live social module, wherein the live social module is configured to be rendered in conjunction with a link associated with the topic, and wherein the live social module comprises an interface that displays, in real-time responsive to the receiving of the first post:
the content of the first post, and
identifying information that is associated with the author-user;
receive, by the one or more computing devices, a plurality of additional posts composed by users of the online social network, each additional post being associated with the topic;
push, in response to receiving the plurality of additional posts, at a first time interval, by the one or more computing devices to the respective client system of each second user, information configured to display content of one or more of the additional posts in the interface of the live social module; and
send, at each of a plurality of time intervals, by the one or more computing devices to the respective client system of each identified second user, information configured to refresh, in real-time responsive to the pushing of the one or more additional posts, the interface of the live social module with another post associated with the topic.

27. The media of claim 26, wherein the software, when executed to identify the one or more second users, is operable to:
access a social graph comprising a plurality of nodes and a plurality of edges connecting the nodes, each of the edges between two of the nodes representing a single degree of separation between them, the nodes comprising:
a first node corresponding to the author-user; and
a plurality of other nodes that each correspond to concepts or users associated with the online social network; and
identify users corresponding to one or more user nodes that are each directly connected to the first node by an edge.

28. The media of claim 26, wherein the software, when executed to generate a live social module, is operable to:

aggregate one or more posts associated with the topic by one or more author-users by querying a post-index of the online social network;
calculate, for each second user, a quality-score for each of the aggregated posts; and
select, for each second user, one or more posts having a quality-score higher than a threshold quality-score.

29. The media of claim 28, wherein the quality-score of a post is based on a relationship on the social network between a respective author-user and the second user.

30. The media of claim 28, wherein the quality-score of a post is based on a social-graph affinity for the second user with respect to a respective author-user.

31. The media of claim 28, wherein the quality-score of a post is based on whether a respective author-user is identified as a key-author with respect to the topic.

32. The media of claim 28, wherein the quality-score of a post is based on a sentiment of the post.

33. The media of claim 28, wherein the quality-score of a post is based on information associated with the second user.

34. The media of claim 33, wherein the information associated with the second user comprises one or more of demographic information associated with the second user or a history of activity by the second user on the online social network.

35. The media of claim 26, wherein the software is further operable when executed to update the live social module with one or more third posts.

36. The media of claim 35, wherein the live social module is updated with one or more third posts by generating a replacement live social module to replace the live social module that was previously sent to the one or more second users.

37. A system comprising: one or more processors; and a non-transitory memory coupled to the processors comprising instructions executable by the processors, the processors operable when executing the instructions to:
receive, at one or more computing devices from a client system associated with an author-user of an online social network, instructions for publishing a first post composed by the author-user, the first post comprising a content of the first post and a metadata associated with the first post;
extract, by the one or more computing devices, one or more n-grams from the content of the first post and the metadata associated with the first post;
determine, by the one or more computing devices, whether the first post is associated with a topic based on whether one or more of the extracted n-grams are associated with the topic;
identify, by the one or more computing devices, a plurality of second users, wherein each second user is a first-degree connection of the author-user within the online social network;
identify, by the one or more computing devices, one or more of the second users as a subscribing user to the topic based on a determination that the second user is accessing a page associated with the topic;
generate, by the one or more computing devices, for each identified second user, a live social module associated with the topic for presenting, in real time, posts shared on the online social network;
send, by the one or more computing devices, to a respective client system of each identified second user, information configured to render a search-results page comprising the live social module, wherein the live social module is configured to be rendered in conjunction with a link associated with the topic, and wherein the live social module comprises an interface that displays, in real-time responsive to the receiving of the first post:
the content of the first post, and
identifying information that is associated with the author-user;
receive, by the one or more computing devices, a plurality of additional posts composed by users of the online social network, each additional post being associated with the topic;
push, in response to receiving the plurality of additional posts, at a first time interval, by the one or more computing devices to the respective client system of each second user, information configured to display content of one or more of the additional posts in the interface of the live social module; and
send, at each of a plurality of time intervals, by the one or more computing devices to the respective client system of each identified second user, information configured to refresh, in real-time responsive to the pushing of the one or more additional posts, the interface of the live social module with another post associated with the topic.

* * * * *